United States Patent [19]

Saitoh

[11] Patent Number: 5,775,813
[45] Date of Patent: Jul. 7, 1998

[54] SEAL STRUCTURE-CARRYING LINEAR MOTION GUIDE UNIT

[75] Inventor: Masahide Saitoh, Gifu-ken, Japan

[73] Assignee: Nippon Thompson Co., Ltd., Tokyo, Japan

[21] Appl. No.: 863,304

[22] Filed: May 27, 1997

[30] Foreign Application Priority Data

May 27, 1996 [JP] Japan .................. 8-152925

[51] Int. Cl.⁶ ..................................... F16C 29/06
[52] U.S. Cl. .............................. 384/15; 384/45
[58] Field of Search ................... 384/45, 44, 43, 384/15

[56] References Cited

U.S. PATENT DOCUMENTS

| | | | |
|---|---|---|---|
| 5,387,038 | 2/1995 | Abe et al. | 384/15 |
| 5,388,912 | 2/1995 | Agari | 384/15 |
| 5,496,113 | 3/1996 | Winkelmann et al. | 384/15 |

FOREIGN PATENT DOCUMENTS

| | | |
|---|---|---|
| 04-023818 | 2/1992 | Japan . |
| 02-048612 | 4/1992 | Japan . |
| 06-264923 | 9/1994 | Japan . |
| 06-038177 | 10/1994 | Japan . |
| 09-042284 | 2/1997 | Japan . |

*Primary Examiner*—Lenard A. Footland
*Attorney, Agent, or Firm*—Browdy and Neimark

[57] ABSTRACT

This linear motion rolling guide unit is provided with a seal structure capable of being applied to an existing linear motion rolling guide unit without changing the basic specifications thereof. A positioning pin-carrying mounting plate is fixed to a slider. Each of seal members incorporated in the seal structure comprises an upper seal portion and side seal portions. The positioning pins provided on the mounting plate are inserted into positioning pin holes of the seal members, whereby the seal members are positioned, the seal members being then fixed to the mounting plate by fixing screws inserted thereinto from the outer side of a scraper plate provided in contact with the seal members. The seal members of the seal structure are renewed by removing the same by outstretching the side seal portions thereof around the central parts of the upper seal portions thereof, and installing new seal members.

8 Claims, 5 Drawing Sheets

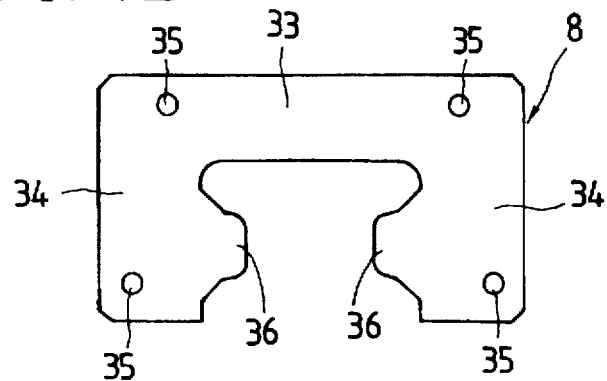
FIG. 12
FIG. 13
FIG. 14 (PRIOR ART)
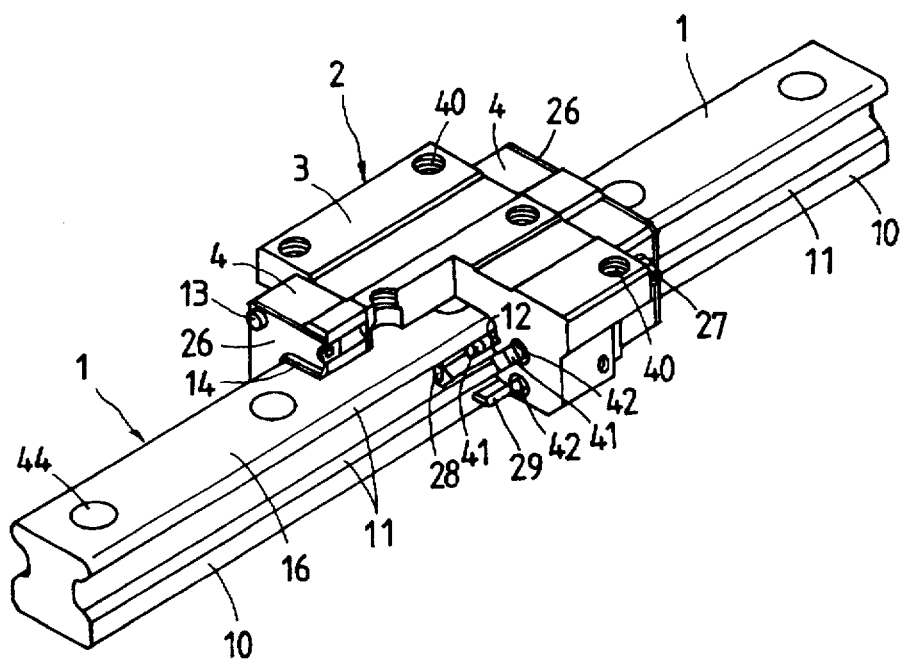

SEAL STRUCTURE-CARRYING LINEAR MOTION GUIDE UNIT

BACKGROUND OF THE INVENTION

1. Field of the Invention

This invention relates to a linear motion rolling guide applied to, for example, various kinds of manufacturing apparatuses and various kinds of machines, and more particularly to a linear motion rolling guide unit provided with a seal structure capable of being fixed simply to an existing linear motion rolling guide unit.

2. Description of the Prior Art

As shown in FIG. 14, a conventional linear motion rolling guide unit comprises a track rail 1 having raceway surfaces (raceway grooves) 11 on both of longitudinal side surfaces 10 thereof, and a slider 2 saddled slidably on the track rail 1. The track rail 1 is fixed to other part, such as a base by bolts inserted into fixing holes 44. The slider 2 has a casing 3 relatively slidable with respect to the track rail 1, and provided with raceway surfaces (raceway grooves) 12 on the portions thereof which are opposed to the raceway surfaces 11, a plurality of rolling elements (rollers) 41 adapted to be rolled relatively movably between the opposed raceway surfaces 11, 12, and end caps 4 attached to both end surfaces of the casing 3 with respect to the sliding direction, i.e., in the longitudinal direction thereof.

End seals 26 for attaining the longitudinal sealing of clearances between the track rail 1 and slider 2 are attached to the end caps 4, and grease nipples 27 for supplying a lubricant to the rolling elements 41 between and the sliding surfaces of the track rail 1 and slider 2 are also provided on the end caps 4. In order to prevent the rolling elements 41 from falling from the casing 3, retainer members 28 are fixed to the casing 3 so as to enclose the rolling elements 41. In order to seal the clearances between the casing 3 and end caps 4 and both of the longitudinal side surfaces 10 of the track rail 1, lower seals 29 are fixed to the lower surfaces of the end caps 4 and casing 3. As the slider 2 is moved slidingly with respect to an upper side of the track rail 1, the rolling elements 41 roll and circulate sequentially in the raceways between the raceway surfaces 11, 12, direction changing passages in the end caps 4, and return passages 42 in the casing 3. The slider 2 is provided with mounting threads 40 for fixing some other part, such as a support member thereto.

When extraneous matter, such as dust and chips enter the clearances between the track rail 1 and slider 2 and are deposited on the raceway surfaces 11, 12, the smooth rolling of the rolling elements 41 is hampered. Therefore, end seals 26 are usually fixed to the end surfaces of the end caps 4 by screws 13 so as to prevent the entry of extraneous matter into the clearances in both the front and rear ends of the slider 2. However, large chips, and chips occurring in large quantities cause seal lips 14 of the end seals 26 to be deformed or broken, so that they enter the interior of the slider 2 in some cases. Consequently, in order to put a linear motion rolling guide unit, a precision part, to practical use in a severe working environment in which large-sized or a large quantity of extraneous matter occurs, it is indispensable to take some other dust-proofing measures.

In a conventional linear motion rolling guide unit, a seal structure is provided in addition to the end seals 26 so as to double the sealing function. Namely, a linear motion rolling guide unit provided with a seal structure supplementing the function of the end seals 26 was developed.

For example, in a seal structure disclosed in Japanese Utility Model Laid-Open No. 48612/1990, an end seal is sandwiched at the front and rear sides thereof between outer and inner protectors the outer shape of which is substantially identical with that of the end seal, and a combination of these parts in this condition is fixed to an end surface of a casing. The extraneous matter, such as a large amount of chips are eliminated by the outer protector, and the fine extraneous matter passed through a clearance between the outer protector and a track rail by a seal lip of the end seal. Since the inner protector is applied closely to the inner side of the end seal, the seal lip of the end seal is supported properly, and the passage of the extraneous matter bitten by and drawn around the seal lip to the inner side of the casing is prevented.

There are other conventional linear motion rolling guide units, for example, a linear motion rolling guide unit (Japanese Patent Laid-Open No. 264923/1994) provided with a seal structure formed by fixing a double wiper to an end surface of a casing, providing a sealed space between the wiper members and a track rail surface, and providing a means for introducing a pressure air into the sealed space, and a linear motion rolling guide unit (Japanese Utility Model Publication No. 38177/1994) provided with a seal structure formed by fixing an air blower to an outer end surface of an end seal via a spacer so that an air outlet of the air blower is positioned near an upper surface of a track rail and raceway surfaces.

This end seal is constantly in slide contact with the track rail and eliminates the extraneous matter deposited on the track rail, so that the deterioration of the sealing performance of the end seal due to the abrasion thereof is not avoided. It then becomes necessary to renew the worn seal, and, accordingly, it has been demanded increasingly that a seal structure which can be fixed and removed easily be developed.

The seal structures meeting such a demand include, for example, a seal structure disclosed in Japanese Utility Model Laid-Open No. 23818/1992. This seal structure is formed so that it can be fixed with a single operation in which an end seal is inserted into a recess, which is formed in an opened end of an end cap, from the lower side of the end cap.

The conventional seal structures are capable of obtaining a high effect. However, in order to apply such a seal structure to a commercially available linear motion rolling guide unit shown in FIG. 14, the basic specifications of the guide unit are necessarily changed.

When a seal in a conventional seal structure is broken or worn out, it cannot be removed simply, and it is troublesome to fix a new seal. Namely, the replacement of a seal can be carried out by breaking and removing a worn seal but a new seal has to be inserted from an end of a track rail. The same applies to the seal structure discloses in the above-mentioned Japanese Utility Model Laid-Open No. 23818/1992 in which the fixing and removing of an end seal can be done easily.

The applicant of the present invention discussed the solving these problems with a linear motion rolling guide unit, developed a linear motion rolling guide unit having a seal structure capable of being fixed to and removed from a slider easily without changing the basic specifications of the guide unit, and filed a patent application therefor (Japanese Patent Laid-Open No. 42284/1997) prior to the application for the present invention. However, in the linear motion rolling guide unit mentioned above, in which a seal cassette is attached to an end surface of a miniaturized slider, it is difficult that the seal cassette be fixed to the slider since the slider has a small seal cassette fixing space.

SUMMARY OF THE INVENTION

An object of the present invention is to solve these problems, and provide a linear motion rolling guide unit having a seal structure which can be applied to a conventional linear motion rolling guide unit without changing the basic specifications thereof, and which can be easily fixed to and removed from an end surface of a slider even when the slider has a miniaturized construction and a small seal structure fixing space.

The present invention relates to a linear motion rolling guide unit provided with a track rail having first raceway surfaces on both of longitudinally extending side portions thereof, a slider which has second raceway surfaces opposed to the first raceway surfaces, and which is moved slidingly and relatively on the track rail via rolling elements, and a seal structure fixed to an end surface of the slider and moved slidingly and relatively on the track rail, wherein the seal structure comprises seal members including upper seal portions slidably contacting an upper surface of the track rail, and a pair of side seal portions extending downward from both sides of the upper seal portions and outstretchable with respect to each other around predetermined parts of the upper seal portions, positioning pins provided on the slider and inserted into pin holes provided in the side seal portions of the seal members, and a scraper plate contacting the end surface of the outer seal member which is on the opposite side of the slider, and positioned on the track rail with narrow clearances left therebetween.

These positioning pins are fixed to a mounting plate secured to an end surface of the slider. In another embodiment, the positioning pins are fixed to the slider.

The seal members are formed of elastic elements alone which constitute the upper seal portions and side seal portions all of which have a sealing function, or comprise elastic elements, and plate type metal cores fixed to the elastic elements and divided at predetermined parts of the upper seal portions with a clearance of a predetermined width left between the divisional metal cores, so as to enable the side seal portions to be outstretched with respect to each other.

The seal members are provided with lubricant ports and lubricant grooves. The seal members are also provided with seal lips slidingly contacting the upper and side surfaces of the track rail and displaying a sealing action. The seal members do not necessarily comprise two laminated members, and they may comprise one member or three laminated members, if necessary. The slider has a casing provided with the second raceway surfaces, end caps attached to both end surfaces of the casing, and end seals attached to the end surfaces of the end caps.

Since the seal structure is formed as described above, it can be fixed easily to an end surface of a slider even when the slider has a miniaturized construction and a small seal structure fixing space. Especially, when an old worn seal member saddled on the track rail is renewed, the seal member is removed from the positioning pins, and a pair of side seal portions of the seal member are outstretched, the old seal member being thus removed from an upper portion of the track, a pair of side seal portions of a new seal member being then outstretched to enable the new seal member in this condition to be fitted around the track rail from the upper side thereof and fixed thereto in a track rail-saddled state. In this linear motion rolling guide unit, the seal members can be removed from and mounted on the track rail from the upper side thereof. Namely, the inserting or removing of seal members into or from an end portion of a track rail as in a conventional linear motion rolling guide unit may not be done, so that a seal member replacement operation can be carried out simply.

This linear motion rolling guide unit is constructed as described above. Therefore, when a mounting plate is fixed to the slider with a seal structure fixed to the slider via the mounting plate, the seal structure can be fixed to various kinds of existing linear motion rolling guide units without changing the basic specifications of the linear motion rolling guide unit at all. This seal structure can be applied with the dimensions thereof left as they are to linear motion rolling guide units having sliders of even different shapes and dimensions as long as the linear motion rolling guide units use track rails of the same standards. Accordingly, a seal structure of a wide range of application can be provided. This seal structure can also be fixed simply to an end surface of a slider of a conventional linear motion rolling guide unit already incorporated in a cutting machine. Therefore, a demand for an improved sealing performance of a linear motion rolling guide unit in an existing machine can also be met.

When the seal members of this seal structure fixed to the linear motion rolling guide unit incorporated in a cutting machine need be renewed during the maintenance work or since they are damaged or deteriorated, they alone in the seal structure can be replaced by new ones. Namely, the fixing screws are removed from the scraper plate, and the old worn seal members and scraper plate are moved slightly in the axial direction. The side seal portions of these seal members saddled on a track rail are then outstretched, and the seal members are removed from an upper portion of the track rail. The side seal portions of new seal members are then outstretched, and the new seal members in this condition are fitted around the track rail from the upper side thereof, whereby the new seal members can be set in a saddled state on the track rail. Since the seal members can be removed from and fixed to the upper surface of the track rail simply in this manner, the removing and inserting of seal members and scraper plate carried out via an end portion of a track rail in a conventional linear motion rolling guide unit become unnecessary, and the seal member replacement work can be simply carried out.

BRIEF DESCRIPTION OF THE DRAWINGS

FIG. 12 is a side view showing a scraper plate;

FIG. 13 is a front view of the scraper plate of FIG. 12; and

FIG. 14 is a perspective view showing a conventional linear motion rolling guide unit.

DESCRIPTION OF THE PREFERRED EMBODIMENT

Figure 1:
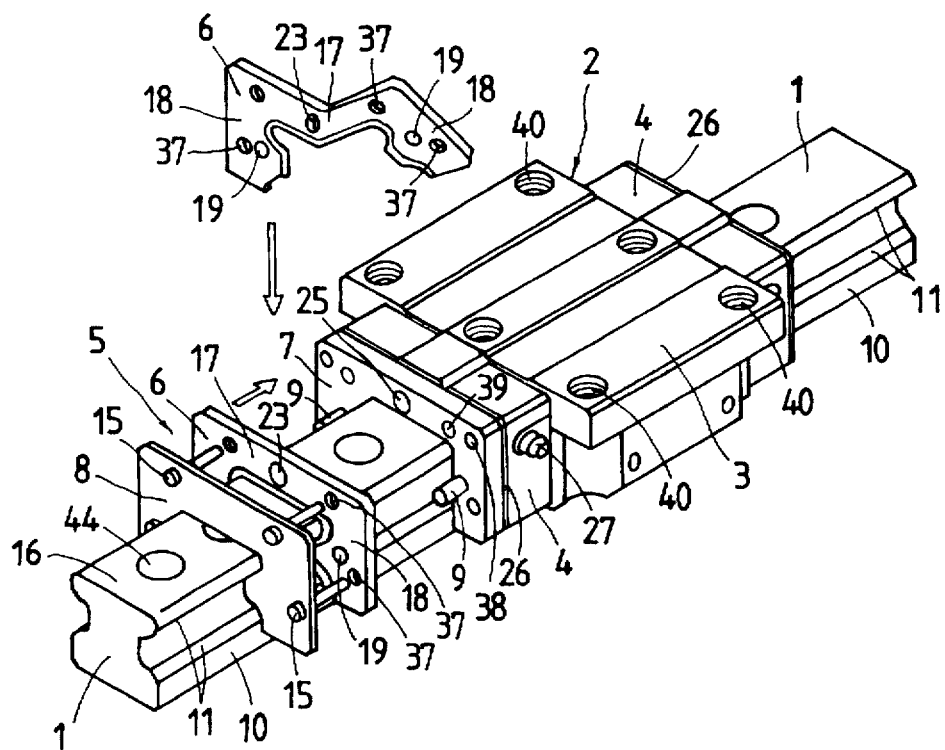
FIG. 1 is a partially exploded perspective view showing an embodiment of the linear motion rolling guide unit according to the present invention.
Figure 2:
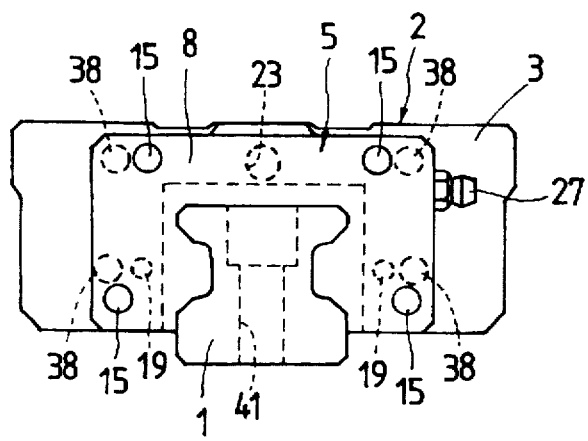
FIG. 2 is a side view of the embodiment of FIG. 1.
Figure 3:
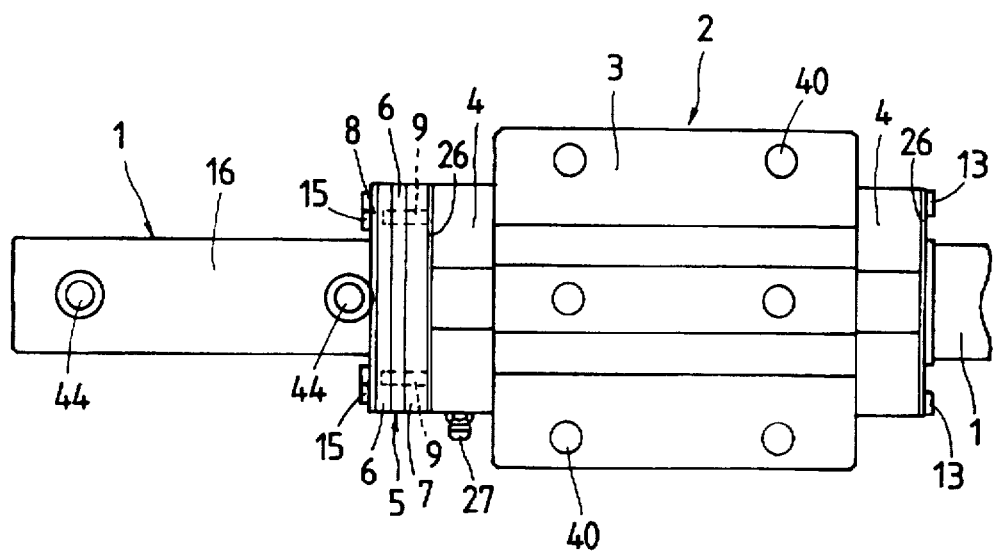
FIG. 3 is a plan view of the embodiment of FIG. 1.
Figure 4:
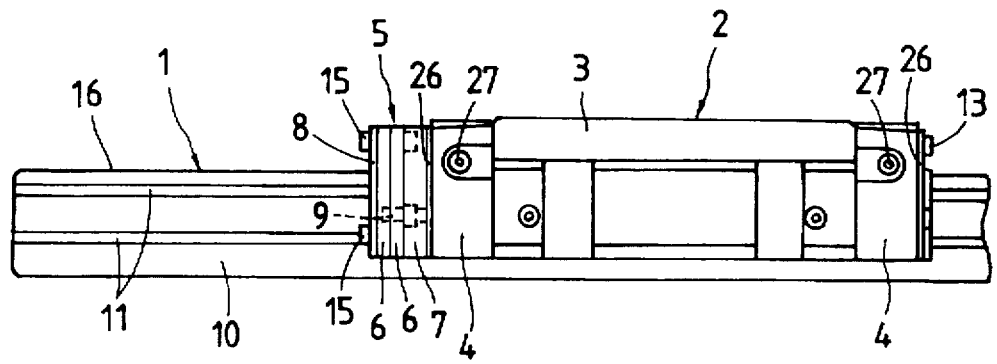
FIG. 4 is a front view of the embodiment of FIG. 1.
Figure 5:
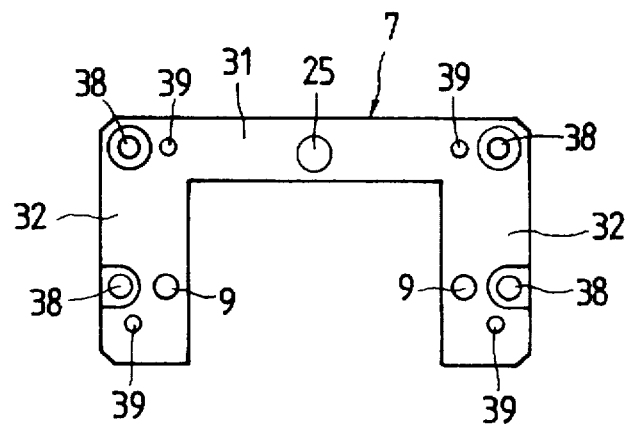
FIG. 5 is a side view of a mounting plate.
Figure 6:
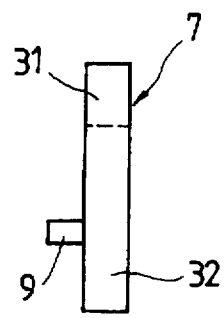
FIG. 6 is a front view of the mounting plate of FIG. 5.
Figure 7:
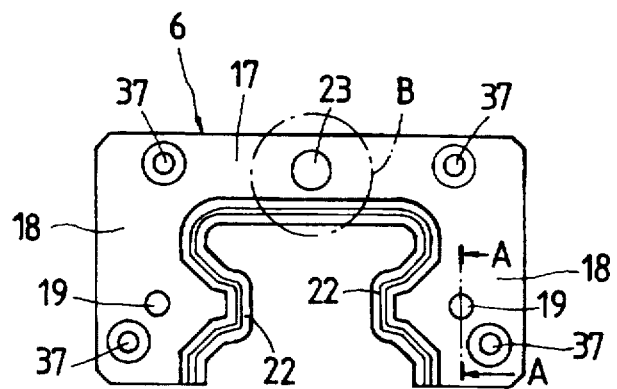
FIG. 7 is a side view of a seal member.

An embodiment of the linear motion rolling guide unit according to the present invention will now be described with reference to the drawings. Referring to the drawings, the parts having construction and functions identical with those of the parts of the conventional linear motion rolling guide unit shown in FIG. 14 are designated by the same reference numerals.

In the linear motion rolling guide unit of this embodiment, parts constituting a seal structure 5 to be provided on one end surface of a slider 2 are separately shown. Such a seal structure can also be provided on the other end surface of the slider in the same manner. This linear motion rolling guide unit comprises mainly a track rail 1 provided with raceway surfaces (raceway grooves) 11 on both of longitudinal side portions 10 thereof, and a slider 2 slidably saddled on the track rail 1. The track rail 1 has an I-shaped cross section. i.e., it is recessed at both side portions 10 thereof. The slider 2 is slidable relatively to the track rail 1, and has a casing 3 slidable relatively to the track rail 1 and provided with raceway surfaces on the portions thereof which are opposed to the raceway surfaces 11, a plurality of rolling elements (balls or cylindrical rollers) adapted to roll relatively movably between the opposed raceway surfaces 11, and end caps 4 fixed to both ends, in the sliding direction, i.e., in the longitudinal direction, of the casing 3.

Seal members 6 for attaining the sealing of longitudinal clearances between the track rail 1 and slider 2 are fixed to the end caps 4, and grease nipples 27 for supplying a lubricant to the rolling elements between the track rail 1 and slider 2 and to both of the raceway surfaces 11 are also provided on the end caps 4. In order to prevent the rolling elements (corresponding to the parts designated by a reference numeral 41 in FIG. 14) from falling from the casing 3, retainer members (corresponding to the parts designated by a reference numeral 28 in FIG. 14) are fixed to the casing 3 so as to enclose the rolling elements. In order to seal the clearances between the casing 3 and end caps 4 and both of the longitudinal side portions 10 of the track rail 1, lower seals (corresponding to the parts designated by a reference numeral 29 in FIG. 14) are fixed to lower surfaces of the end caps 4 and casing 3. In this embodiment, the slider 2 is provided with end seals 26 on the end surfaces of the end caps 4.

The slider 2 is placed in a saddled state on the track rail 1 and adapted to be slid freely via a plurality of rolling elements circulated along the raceway surfaces 11 of the track rail 1. The rolling elements in load regions which roll on the raceway surfaces 11 of the track rail 1 are guided to direction changing passages formed in the end caps 4 and moved to return passages (corresponding to the parts designated by a reference numeral 42 in FIG. 14) formed in parallel with the raceway surfaces of the casing 3, whereby the rolling elements are endlessly circulated in endless circulating passages. The slider 2 can be slid freely and relatively on the track rail 1 owing to the rolling movement of the loaded rolling elements positioned between the raceway surfaces formed on the slider 2 and those 11 formed on the track rail 1.

In order to improve the sealing performance of this linear motion rolling guide unit, a seal structure 5 is fixed to an outer end surface of the slider 2, i.e., an end surface of an end seal 26 via a mounting plate 7. The seal structure 5 shown as an example in the drawings is provided on one end surface of the slider 2 but both end surfaces of the slider 2 may be provided therewith. Although the seal structure is fixed via the end seal 26, the end seal 26 may not be provided in a certain case. The seal structure 5 is fixed to the slider 2 by fixing screws 15. The seal structure 5 has a mounting plate 7 provided on an end surface of an end cap 4, seal members 6 provided in contact with the mounting plate 7, and a scraper plate 8 constituting an outermost part provided in contact with an end surface of an outer seal member 6.

In this embodiment, the mounting plate 7 is provided with positioning pins 9, and has a function of a spacer, the mounting plate 7 comprising a bridge portion 31, and side portions 32 extending downward from both sides of the bridge portion 31. Positioning pins 9 are fixed to the side portions 32 of the mounting plate 7 so as to project from an end surface thereof so as to position the seal members 6 with respect to the slider 2. The mounting plate 7 is also provided with fixing holes 38 for fixing the mounting plate 7 to the slider 2 by fixing screws (not shown), and tapping screw holes 39 into which setting screws, i.e. fixing screws 15 for fixing the scraper plate 8 and seal members 6 to the mounting plate 7 are thrusted. The seal members 6 can be set in proper positions with respect to the slider 2 by inserting the positioning pins 9 into positioning pin holes 19 formed in the side seal portions 18, whereby a sealing pressure of the seal members 6 can be set to a proper level with respect to the track rail 1. The bridge portion 31 of the mounting plate 7 is provided at the central part thereof with a lubricant port 25, which is formed so that the lubricant port is filled with a lubricant supplied from the grease nipples 27. The positioning pins 9 can also be fixed to an end cap 4 which constitutes the slider 2, and to an end seal 26 in a certain case, though these examples are not illustrated.

Each of the seal members 6 comprises an upper seal portion 17 slidably contacting an upper surface 16 of the track rail 1, and a pair of side seal portions 18 extending downward from both sides of the upper seal portions 17 and capable of being outstretched with respect to each other around a predetermined part of the upper seal portion 17. The side seal portions 18 of the seal member 6 are provided with positioning pin holes 19. Although two seal members 6 are shown in the drawings, the number thereof is not limited to two, and one or not less than three seal members 6 can be incorporated in the seal structure 5. Since each seal member 6 is fixed in a proper position by fixing screws 15, it is provided with fixing holes 37 through which the fixing screws 15 are inserted, and the portions of the elastic member which are around the fixing holes 37 are countersunk. The seal member can be fixed by fitting non-elastically-deformable collars in the counter-sunk portions thereof.

Figure 8:
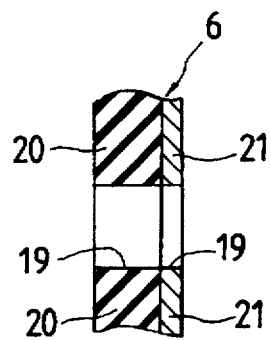
FIG. 8 is a sectional view taken along the line A—A in FIG. 7.
Figure 9:
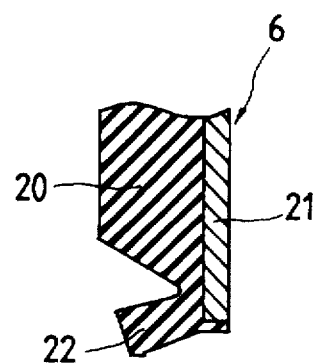
FIG. 9 is a sectional view showing a lip of the seal member.

The two seal members 6 have the same construction, and are shaped so that they are closely fitted around the cross-sectionally I-shaped track rail 1 and seal the clearances between the track rail 1 and slider 2. As shown in FIGS. 8 and 9, each seal member 6 constituting the seal structure 5 comprises an elastic element 20 which is formed of an upper seal portion 17 and side seal portions 18 having a sealing function, and which is formed out of a material, such as rubber, and a plate type metal core 21 formed of an iron plate which is fixed to the elastic element 20 by burning, and which is divided at a predetermined part (central part in the illustrated example) of the upper seal portion 17 with a predetermined space left between the resultant divisional cores, in such a manner that the side seal portions 18 can be outstretched with respect to each other. Of course, the seal member 6 can comprise the elastic part 20 alone which is formed out of a material, such as rubber, and which constitute the upper and side seal portions 17, 18 having a sealing function.

Figure 10:
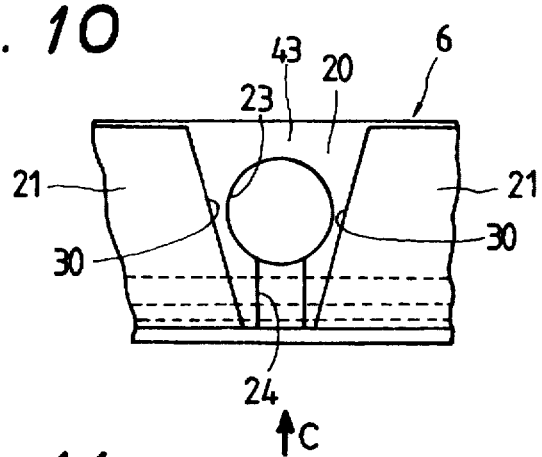
FIG. 10 is a side view showing a rear surface of a region designated by a reference letter "B" in FIG. 7.
Figure 11:
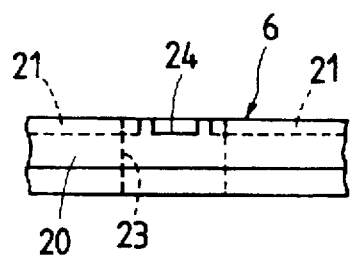
FIG. 11 is a bottom view taken in the direction of an arrow C in FIG. 10.

As shown in FIGS. 10 and 11, each seal member 6 is provided with a lubricant port 23, which communicates with the lubricant port 25 of the mounting plate 7, and a lubricant groove 24. The elastic element 20 of the seal member 6 is provided with a seal lip 22 as shown in FIG. 9 which slidingly contacts the upper and side surfaces 16, 10 of the track rail 1 and makes a sealing action, and this seal lip 22 may comprise a double seal lip having front and rear seal lip portions. The seal lip 22 covers and contacts the upper surface 16 and both side surfaces 10 of the track rail 1 to prevent the entry from the outside of extraneous matter, such as dust into the clearances between the track rail and slider and retain an oil in the interior of these clearances. Since the portions of the seal lip 22 which seal the side surfaces 10 of the track rail 1, and the portion thereof which seals the upper surface 16 of the track rail 1 are integral, the seal lip can be handled easily as compared with a separately formed seal lip.

The elastic element 20 of each seal member 6 is formed so that the side seal portions 18 can be outstretched freely as shown in FIG. 1 around an elastically deformable flexure part 43 between end surfaces 30 of left and right parts of the metal core 21, i.e., at the central part of a rear surface of the upper seal portion 17. Although the seal member 6 has a flat plate type metal core 21, the metal core 21 has a two-divided structure in which the part thereof which corresponds to the flexure part 43 of the elastic element 20 is cut off. Accordingly, the metal core 21 does not hamper the outstretching deformation of the seal member 6. The seal member 6 is provided with positioning pin holes 19 in at least two portions thereof so as to position the seal member 6 at a proper sealing pressure with respect to the track rail 1.

The scraper plate 8 comprises a thin plate, and a contour of an inner portion thereof is in conformity with a cross-sectional shape of the track rail 1. The scraper plate 8 set on the slider does not contact the track rail 1, i.e., narrow (for example, around 0.2 mm) clearances are left, from which large extraneous matter deposited on the track rail 1 is removed. The scraper plate 8 is formed so that it has, for example, a substantially inverted U-shaped cross section, and has projecting portions 36, which are engaged with the raceway surfaces 11 of the track rail 1, just as the seal members 6. The scraper plate 8 is in contact with the end surface of the outer seal member 6 which is on the opposite side of the slider, and it is positioned on the track rail 1 with narrow clearances left between itself and track rail 1. The scraper plate 8 comprises a bridge portion 33, and side portions 34 extending downward from both sides of the bridge portion 33. The scraper plate has four fixing holes 35. The bridge portion 33 is provided with two fixing holes 35, and each side portion 34 one fixing hole 35, these fixing holes 35 being made in the parts corresponding to the fixing holes 37 of the seal members 6. The scraper plate 8 is fixed to the mounting plate 7 by inserting the fixing screws 15 into the fixing holes 35, and turning the same screws 15 into the fixing threads in the mounting plate 7. Of course, the seal structure 5 can also be fixed to the slider 2 by turning the fixing screws 15 to the casing 3.

In this linear motion rolling guide unit, the tightening margins of the seal lips 22 of the seal members 6 are determined by the positions of the positioning pins 9. Therefore, when a mounting plate 7 to which the positioning pins 9 are fixed is employed, the mounting plate 7 has to be set on a proper portion of the slider 2 with respect to the track rail 1 by a master tool. No matter how many times the seal members 6 are replaced, the fixing thereof including the tightening margins of the seal lips 22 can be done with a high accuracy at all times. The seal members 6 have, for example, lubricant ports 23 and lubricant grooves 24 in the flexure parts 43 in the central regions of the upper seal portions 17 for lubricating the seal lips 22 thereof with respect to the track rail 1. Therefore, a lubricant supplied from the grease nipples 27 is sent to the seal lips 22 of the seal members 6 through the lubricant port 25 of the mounting plate 7 and the lubricant ports 23 and lubricant grooves 24 of the seal members 6, the resultant lubricant being supplied to the sliding surfaces of the seal structure with respect to the track rail 1.

This linear motion rolling guide unit has the above-described construction. When the seal members 6 of the seal structure 5 are replaced because they are deteriorated or damaged or during the maintenance work therefor, for example, the following procedure can be taken.

First, the fixing screws 15 by which the scraper plate 8 and two seal members 6 are tightened together are removed. The scraper plate 8 and seal members 6 are then removed from the positioning pins 9 of the mounting plate 7 by sliding the former on the track rail 1. The side seal portions 18 of the seal members 6 to be removed from the track rail 1 are outstretched by deforming the upper seal portions 17 thereof, and the seal members 6 are thereby removed from the track rail 1. New seal members 6 are then deformed in the same manner as mentioned above, and fitted around the track rail 1. These seal members 6 are slid on the track rail 1, and positioned by inserting the positioning pins 9 through the pin holes 19 of the seal members 6. The scraper plate 8 is slid on the track rail 1, and this scraper plate 8 and seal members 6 are tightened together by the fixing screws 15.

As described above, when the seal members 6 are renewed, it is not necessary that the seal members 6 and scraper plate 8 be moved to and from and end portion of the track rail for the purpose of removing and setting such parts from and on the track rail 1. Namely, as shown in FIG. 1, the seal members 6 can be fitted around and removed from the track rail 1 directly from the above in the direction perpendicular to the axial direction of the track rail 1. The seal members 6 can be drawn out simply in the upward direction of the track rail 1 by merely removing the fixing screws 15, moving the seal members 6 and scraper plate 8 slightly in the axial direction of the track rail 1 and outstretching the seal members 6. In order to set new seal members 6 on the track rail 1, the former are set in an outstretched state on the latter so as to saddle the same from the above, and the outstretched seal members 6 are then closed with the projecting portions thereof engaged with the raceway surfaces 11 of the track rail 1, whereby the seal members can be mounted on the track rail. Accordingly, the mounting and removing of the seal members 6 of the seal structure 5 can be done simply in a linear motion rolling guide unit having, especially, a track rail 1 of a large length.

The seal structure 5 in this linear motion rolling guide unit can be fixed simply to an end surface of a slider 2 of even a conventional linear motion rolling guide unit without changing the basic specifications thereof at all. When this seal structure 5 is incorporated in a conventional linear motion rolling guide unit, the sealing function of the guide unit is further improved. Especially, even when a linear motion rolling guide unit having such a seal structure 5 is used in an environment in which extraneous matters, such as chips occur in large quantities, the dust-proofing effect of the guide unit is high, and the lifetime thereof can be kept long.

What is claimed is:

1. A linear motion rolling guide unit provided with a track rail having first raceway surfaces on both of longitudinally extending side portions thereof, a slider which has second raceway surfaces opposed to said first raceway surfaces, and which is moved slidingly and relatively on said track rail via rolling elements, and a seal structure fixed to an end surface of said slider and moved slidingly and relatively on said track rail, wherein said seal structure comprises seal members including upper seal portions slidably contacting an upper surface of said track rail, and a pair of side seal portions extending downward from both sides of said upper seal portions and outstretchable with respect to each other around predetermined parts of said upper seal portions, positioning pins provided on said slider and inserted into pin holes provided in said side seal portions of said seal members, and a scraper plate contacting an end surface of an outer seal member and positioned on said track rail with narrow clearances left therebetween.

2. A linear motion rolling guide unit according to claim 1, wherein said positioning pins are fixed to a mounting plate secured to an end surface of said slider.

3. A linear motion rolling guide unit according to claim 1, wherein said positioning pins are fixed to said slider.

4. A linear motion rolling guide unit according to claim 1, wherein each of said seal members comprises an elastic element constituting said upper seal portion and said side seal portions all of which have a sealing function, said elastic element being formed so that said side seal portions can be outstretched with respect to each other around a predetermined part of said upper seal portion.

5. A linear motion rolling guide unit according to claim 1, wherein each of said seal members comprises an elastic element constituting said upper seal portion and said side seal portions all of which have a sealing function, and plate type metal cores bonded to said elastic element and divided at a predetermined part of said upper seal portion with a clearance left between said metal cores, in such a manner that said side seal portions can be outstretched with respect to each other.

6. A linear motion rolling guide unit according to claim 1, wherein said seal members are provided with lubricant ports and lubricant grooves.

7. A linear motion rolling guide unit according to claim 1, wherein each of said seal members is provided with seal lips slidably contacting an upper surface and side surfaces of said track rail and making sealing actions.

8. A linear motion rolling guide unit according to claim 1, wherein said slider has a casing provided with said second raceway surfaces, end caps fixed to both end surfaces of said casing, and end seals fixed to end surfaces of said end caps.

* * * * *